Nov. 10, 1925.

J. M. DORTON 1,560,548

DIRIGIBLE HEADLIGHT

Filed July 27, 1923

Inventor:
John M. Dorton,

Witness:
Fred C. Fischer.

By F. G. Fischer,
Attorney.

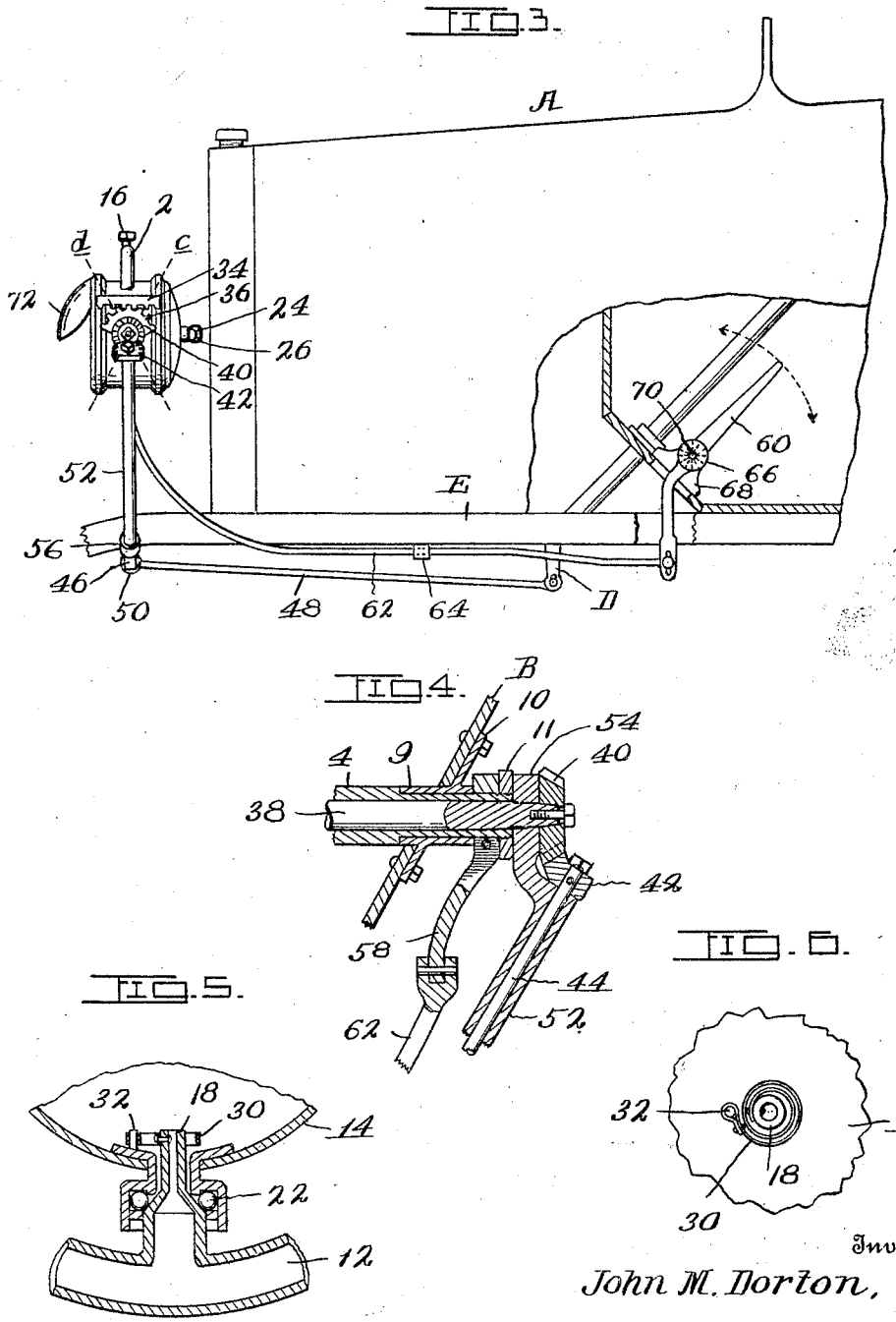

Patented Nov. 10, 1925.

1,560,548

UNITED STATES PATENT OFFICE.

JOHN M. DORTON, OF BONNER SPRINGS, KANSAS.

DIRIGIBLE HEADLIGHT.

Application filed July 27, 1923. Serial No. 654,158.

*To all whom it may concern:*

Be it known that I, JOHN M. DORTON, a citizen of the United States, residing at Bonner Springs, in the county of Wyandotte and State of Kansas, have invented certain new and useful Improvements in Dirigible Headlights, of which the following is a specification.

My invention relates to dirigible headlights for motor vehicles and embodies mechanism connecting said headlights to the steering mechanism, so that the headlights will be automatically controlled to throw the rays of light in the direction of travel and in advance of the vehicle when taking curves.

The invention further embodies manually controlled mechanisms whereby the driver may tilt the headlights up and down to cast the light rays accordingly, without leaving his seat in the vehicle.

Other features will hereinafter appear, and in order that the invention may be fully understood, reference will now be had to the accompanying drawings, in which:

Fig. 3 is a fragmentary side elevation of the motor vehicle equipped with the invention.

Fig. 4 is an enlarged fragmentary sectional detail on line IV of Fig. 2.

Fig. 5 is an enlarged fragmentary vertical sectional detail on line V of Fig. 1.

Fig. 6 is a fragmentary portion of one of the headlights with a spiral spring connected thereto.

Like reference characters refer to like parts throughout the drawings.

Figure 1:
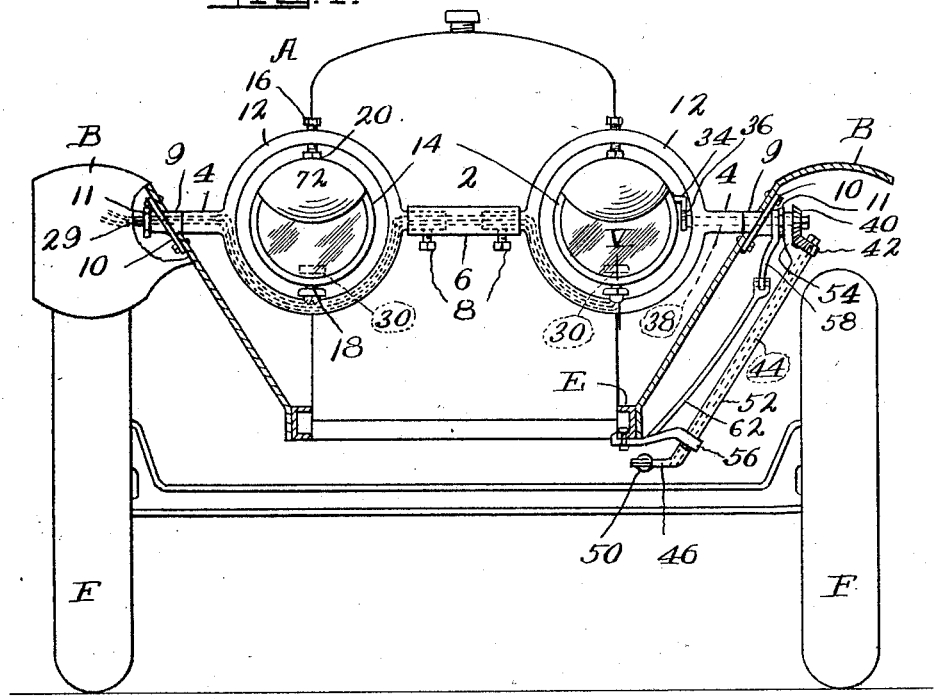
Fig. 1 shows the forward portion of a motor vehicle equipped with the invention.

A, designates a motor vehicle equipped with the usual front fenders B.

2 designates a frame consisting of a pair of end members 4 and an intermediate member 6 to which the end members are adjustably connected by suitable means such as set screws 8. By thus making the frame 2 adjustable it may be lengthened or shortened to accommodate differences in the space between the front fenders of different automobiles. The end members 4 are rockably mounted in bearings 9 on plates 10 firmly secured to the fenders B. Nuts 11 are threaded on the outer ends of the members 4 to coact with the frame 2 in bracing the fenders B and overcoming vibration thereof.

The end members 4 of the frame 2 are provided with circular elements 12 having vertical axes upon which the headlights 14 are mounted to turn laterally. Each axis consists of a set screw 16 and a stub shaft 18 arranged in axial alinement with each other. The set screw 16 is threaded through the upper portion of the associate circular element 12 and its lower end pivotally engages a socket 20 fixed to the upper portion of the associate lamp 14. The stub shaft 18 is fixed to the lower portion of the associate circular element 12 and projects upwardly into the lower portion of the associate lamp 14, ball bearings 22 being provided so that the lamp may readily turn upon said stub shaft 18. The lamps 14 are connected to turn together by suitable means such as a flexible rod 24 supported by a sleeve 26 fixed to an arm 28 extending rearwardly from the intermediate frame member 6. The frame 2 is preferably made of tubing, so that the electric wiring 29 may be run through said frame 2, to the lamps 14.

Figure 2:
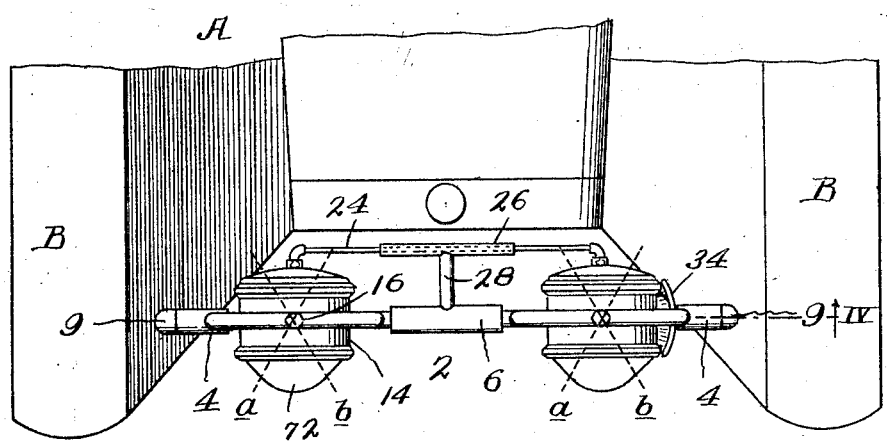
Fig. 2 is a broken plan view of the parts disclosed by Fig. 1.

The lamps 14 are yieldably held in normal position as disclosed by Figs. 1 and 2, through the intermediacy of spiral springs 30, reversely wound to each other. Each spring 30 is connected at one end to the associate stub shaft 18 and at its opposite end to a stud 32, fixed to the lower portion of the associate lamp 14.

The mechanism whereby the lamps 14 are automatically turned to the right or left as indicated by the dotted lines *a* and *b*, through the intermediacy of the steering mechanism of the vehicle will now be described. 34 designates a rack fixed to the side of the lamp 14 adjacent to said steering mechanism. Said rack 34 is of arcuate form in plan view, the arc being struck from the axis upon which the lamp turns, so that the rack 34 will remain in mesh with a segmental gear 36 as it turns the lamp. The gear 36 is fixed upon one end of a shaft 38 journaled in the adjacent portion of the frame 2 and provided at its opposite end with a fixedly mounted bevel gear 40 intermeshing with a segmental bevel gear 42, fixed upon the upper end of a shaft 44 provided at its lower end with a fixedly-mounted arm 46 connected to the forward end of a rod 48 by suitable means such as a universal joint 50. The rod 48 is connected at its rear end to a suitable portion of the steering mechanism such as the crank arm D. The shaft 44 is journaled in a tubular bearing 52 supported at its upper end by an integral arm 54 mounted on the shaft 38 and at its lower end by an arm 56 secured to the side member E of the chassis.

From the foregoing description it is apparent that when the crank arm D of the steering mechanism is actuated to turn the front wheels F in rounding a curve that the lamps 14 will be correspondingly turned through the intermediacy of the intervening mechanism above described and light up the road in advance of the vehicle.

The mechanism for tilting the lights up and down as indicated by dotted lines $c$ and $d$, to cast the light rays accordingly will now be described.

58 designates an arm firmly secured upon the end of the frame member 4 in which the shaft 38 is mounted. Said arm 58 is connected to a manually controlled lever 60 by a connecting rod 62, supported at its intermediate portion by a guide 64 fixed to the adjacent portion of the chassis. The lever 60 is arranged within convenient reach of the driver and may be operated by hand or foot. It is held at any point of its adjustment by suitable means such as a rosette 66, one portion of which is formed integral with the lever 60 and the other portion with a bracket 68 secured to the floor of the vehicle and carrying the fulcrum 70 upon which the lever 60 is mounted.

With the foregoing mechanism the headlights 14 may be tilted downwardly in the direction of the dotted line $d$ by pushing upwardly on the lever 60, or tilted upwardly in the direction of the dotted line $c$ by pulling said lever 60 backwardly.

In addition to the mechanisms above described for automatically turning the lamps 14 laterally and manually tilting them up and down, I have provided deflectors 72 secured to the upper portions of the lamp rims to prevent the rays of light from being cast into the eyes of approaching drivers. Said deflectors 72 are so proportioned as to throw the light upon the road sufficiently in advance for safety and their lower margins are arranged on a curve as disclosed by Fig. 1, so that they will not only throw the light in advance upon the road as stated, but also upon both sides of the road and the front portion of the motor vehicle upon which the lamps are mounted, so that approaching drivers can readily see such vehicle.

From the foregoing description it is apparent that I have produced dirigible headlights and deflectors therefor embodying the advantages above pointed out, and while I have shown and described the preferred construction, combination and arrangement of parts, I reserve the right to make such changes as properly fall within the spirit and scope of the claims.

Having thus described my invention, what I claim and desire to secure by Letters Patent, is:

1. In a dirigible headlight for motor vehicles, a rockable frame extending across the forward portion of the motor vehicle, bearings fixed to opposite sides of the motor vehicle and in which said frame is mounted, manually controlled means for rocking said frame in a vertical plane, a pair of headlights mounted to rock in a vertical plane with said frame and also independently thereof in a horizontal plane, a rack fixed to one of said headlights to rock the same in said horizontal plane, means connecting the headlights so that they will rock together in a horizontal plane, a gear intermeshing with said rack, a shaft journaled in the rockable frame and having said gear fixedly mounted thereon, a second gear fixed to said shaft, and mechanism controlled by the steering mechanism of the car for actuating said second gear and through the intermediacy of the intervening parts above-mentioned effect the rocking of the headlights in a horizontal plane.

2. In a dirigible headlight for motor vehicles, a frame extending across the forward portion of the motor vehicle and embodying a pair of circular elements, manually controlled mechanism for rocking said frame in a vertical plane, a pair of headlights located within said circular elements to rock in a vertical plane therewith, axes carried by said circular elements and on which said headlights are mounted to turn in a horizontal plane, a gear, mechanism controlled by the steering mechanism of the motor vehicle for actuating said gear, a rack intermeshing with said gear and fixed to one side of the headlights to turn the same in said horizontal plane, said rack being in the form of an arc struck from the axis of the headlight to remain in mesh with said gear irrespective of the position in which the headlight is turned, and means through which the last-mentioned headlight turns the companion headlight therewith in a horizontal plane.

In testimony whereof I affix my signature.

JNO. M. DORTON.